(12) United States Patent
Puente Pestaña et al.

(10) Patent No.: US 12,256,466 B2
(45) Date of Patent: Mar. 18, 2025

(54) MAPPING A USER PLANE FUNCTION TO A USER EQUIPMENT

(71) Applicant: Telefonaktiebolaget LM Ericsson (publ), Stockholm (SE)

(72) Inventors: Miguel Angel Puente Pestaña, Madrid (ES); Maria Cruz Bartolomé Rodrigo, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 30 days.

(21) Appl. No.: 17/608,551

(22) PCT Filed: May 31, 2019

(86) PCT No.: PCT/EP2019/064196
§ 371 (c)(1),
(2) Date: Nov. 3, 2021

(87) PCT Pub. No.: WO2020/224791
PCT Pub. Date: Nov. 12, 2020

(65) Prior Publication Data
US 2022/0232369 A1 Jul. 21, 2022

(30) Foreign Application Priority Data
May 6, 2019 (EP) .................... 19382341

(51) Int. Cl.
*H04W 8/20* (2009.01)
*H04L 67/14* (2022.01)

(52) U.S. Cl.
CPC .............. *H04W 8/20* (2013.01); *H04L 67/14* (2013.01)

(58) Field of Classification Search
CPC ................................ H04W 8/20; H04L 67/14
See application file for complete search history.

(56) References Cited

U.S. PATENT DOCUMENTS

| | | | |
|---|---|---|---|
| 11,172,458 B2 * | 11/2021 | Tiwari | H04W 60/00 |
| 11,523,268 B2 * | 12/2022 | Wu | H04L 67/146 |
| 2019/0075511 A1 * | 3/2019 | Ryu | H04W 68/005 |

(Continued)

OTHER PUBLICATIONS

Li et al. (U.S. Appl. No. 62/817,811 for U.S. Patent Publication 2022/0159605) (Year: 2019).*

(Continued)

*Primary Examiner* — Nicholas R Taylor
*Assistant Examiner* — Angela Widhalm De Rodriguez
(74) *Attorney, Agent, or Firm* — Sage Patent Group (57) ABSTRACT

A network function in a telecommunications network is configured for storing information identifying a User Plane Function associated with a communication session. The communication session may be indicated by information identifying the relevant user. A network analytic function can use this stored information to identify the User Plane Function associated with a communication session, and can (Continued)

then subscribe to an event exposure service of the User Plane Function to receive notification about events associated with that communication session. In addition, the network analytic function can subscribe to the network node, in order to be informed about any change to the User Plane Function that is associated with the communication session.

15 Claims, 9 Drawing Sheets

(56) References Cited

U.S. PATENT DOCUMENTS

| | | | | |
|---|---|---|---|---|
| 2019/0098536 A1* | 3/2019 | Qiao | ................... | H04W 36/326 |
| 2019/0158408 A1* | 5/2019 | Li | ........................ | H04W 72/56 |
| 2019/0182875 A1* | 6/2019 | Talebi Fard | ............ | H04W 8/18 |
| 2019/0191467 A1* | 6/2019 | Dao | ...................... | H04W 76/11 |
| 2019/0253917 A1* | 8/2019 | Dao | .................. | H04W 28/0268 |
| 2019/0261260 A1* | 8/2019 | Dao | ...................... | H04W 48/18 |
| 2019/0357301 A1* | 11/2019 | Li | ........................... | H04L 45/74 |
| 2020/0045753 A1* | 2/2020 | Dao | ........................ | H04W 4/08 |
| 2020/0120022 A1* | 4/2020 | Stammers | ........... | H04L 12/4633 |
| 2020/0228605 A1* | 7/2020 | Dodd-Noble | ......... | H04W 12/08 |
| 2022/0159605 A1* | 5/2022 | Li | ........................... | H04L 67/34 |
| 2022/0217794 A1* | 7/2022 | Miklós | .................. | H04W 80/02 |

OTHER PUBLICATIONS

Dao et al. (U.S. Appl. No. 62/714,903 for U.S. Patent Publication 2020/0045753) (Year: 2018).*

International Search Report and Written Opinion of the International Searching Authority for PCT International Application No. PCT/EP2019/064196 dated Mar. 10, 2020.

Nokia et al., "Update to Support PDU Session Binding," S2-1903656, Change Request, SA WG2 Meeting #132, Apr. 8-12, 2019, Xian, 4 pages.

3GPP TS 23.501 V16.0.2, "3rd Generation Partnership Project; Technical Specification Group Services and System Aspects; System Architecture for the 5G System; Stage 2 (Release 16)," Apr. 2019, 317 pages.

Huawei et al., "Discussion on 5GS Bridge management and TSN stream establishment," S2-1905675, 3GPP TSG-SA WG2 Meeting #133, Reno, Nevada, USA May 13-17, 2019, 4 pages.

Communication pursuant to Rule 164(2)(b) and Article 94(3) EPC mailed Aug. 9, 2024 for European Patent Application No. 19727686.8, 11 pages.

Ericsson; "UPF Data Collection"; 3GPP TSG-SA WG2 Meeting #132; S2-1903302; Xi'an, China; Apr. 8-12, 2019; 6 pages.

Ericsson; "Nupf eventexposure"; 3GPP TSG-SA WG2 Meeting #132; S2-1903303; Xi'an, China; Apr. 8-12, 2019; 3 pages.

Orange et al.; "Number of UEs to Collect for Network Performance Information Analytics"; 3GPP TSG-SA WG2 Meeting #132; S2-1904004; Xi'an, China; Apr. 8-12, 2019; 3 pages.

* cited by examiner

MAPPING A USER PLANE FUNCTION TO A USER EQUIPMENT

CROSS REFERENCE TO RELATED APPLICATIONS

This application is a 35 U.S.C. § 371 national stage application of PCT International Application No. PCT/EP2019/064196 filed on May 31, 2019, which claims the benefit of European Patent Application No. 19382341.6, filed on May 6, 2019, the disclosures and content of which are incorporated by reference herein in their entireties.

TECHNICAL FIELD

This relates to a 5G cellular communication network, and in particular to operation of systems for policy, charging and analytics.

BACKGROUND

The 5G network architecture defines a Network Data Analytics Function (NWDAF), which collects data from network functions, retrieves information from data repositories, and provides analytics on demand to other network functions of the 5G core network.

In general, the NWDAF subscribes to a network function, so that it is notified about the occurrence of certain events. The NWDAF thus collects data from the network functions, based on exposure services that are offered by the network functions.

It has been proposed that the User Plane Function (UPF) should implement an event exposure service, but there is no mechanism for a network function, such as the NWDAF, to discover the UPF that is associated to a certain user. Moreover, a user that is initially assigned to one UPF, may be later assigned to another UPF. Thus, even if the UPF implements an event exposure service, there is no way for the NWDAF to ensure that it obtains notifications from the relevant UPF relating to that specific user.

SUMMARY

According to an aspect of the present disclosure, there is provided a method of operation of a network function in a telecommunications network, the method comprising:
 for a communication session, storing information identifying a User Plane Function associated with said communication session.

According to an aspect of the present disclosure, there is provided A method of operation of a network function in a telecommunications network, the method comprising:
 in response to initiation of a data session, sending a User Plane Function discovery request to a Network Repository Function, NRF;
 receiving a response from the NRF, said response containing information identifying at least one User Plane Function, UPF, and information indicating that at least one identified UPF supports an event exposure service;
 selecting an identified UPF; and
 registering the selected UPF in a network function, with information identifying the session, information identifying the selected UPF, and information indicating that the selected UPF supports the event exposure service.

According to an aspect of the present disclosure, there is provided a method of operation of a network function in a telecommunications network, the method comprising:
 sending a query to a second network function, wherein the query contains information identifying a user;
 receiving a response from the second network function, wherein the response contains information identifying a UPF allocated to the user; and
 subscribing to an event exposure service of the UPF.

According to an aspect of the present disclosure, there is provided a method of operation of a network function in a telecommunications network, the method comprising:
 sending a subscription request to a second network function, wherein the subscription request contains information identifying a user, and wherein the subscription request comprises a request to be notified in the event of a change in a UPF allocated to the user.

According to an aspect of the present disclosure, there is provided a method of operation of a network function in a telecommunications network, the method comprising:
 registering with a Network Repository Function, NRF, wherein the step of registering with the NRF comprises sending an indication that the UPF supports the event exposure service, and information identifying at least one event for which the event exposure service is supported.

According to an aspect of the present disclosure, there is provided a method of operation of a network function in a telecommunications network, the method comprising:
 receiving a request for registration from a User Plane Function, UPF, wherein the request comprises an indication that the UPF supports the event exposure service, and information identifying at least one event for which the event exposure service is supported.

According to further aspects of the present disclosure, there are provided network nodes, comprising a processor configured for performing a method according to any of the other aspects.

According to further aspects of the present disclosure, there are provided computer program products, comprising code configured for causing a suitably programmed processor to perform a method according to any of the other aspects.

Thus, there is provided a mechanism and a node that provide the means for a network function to subscribe to event exposure for a specific user and/or session, when that user is assigned to a UPF. The mechanism allows the SMF to provide information about which user/session is assigned to each UPF.

This has the advantage that it allows a network function to subscribe to an Event Exposure service in a UPF, generally using existing subscription mechanisms, and therefore allows greater functionality in a network function such as a NWDAF or NEF.

Further, embodiments have the advantage that event exposure can be continued, even in the event of re-assignment of the subscriber/session to a different UPF.

DETAILED DESCRIPTION

Figure 1:
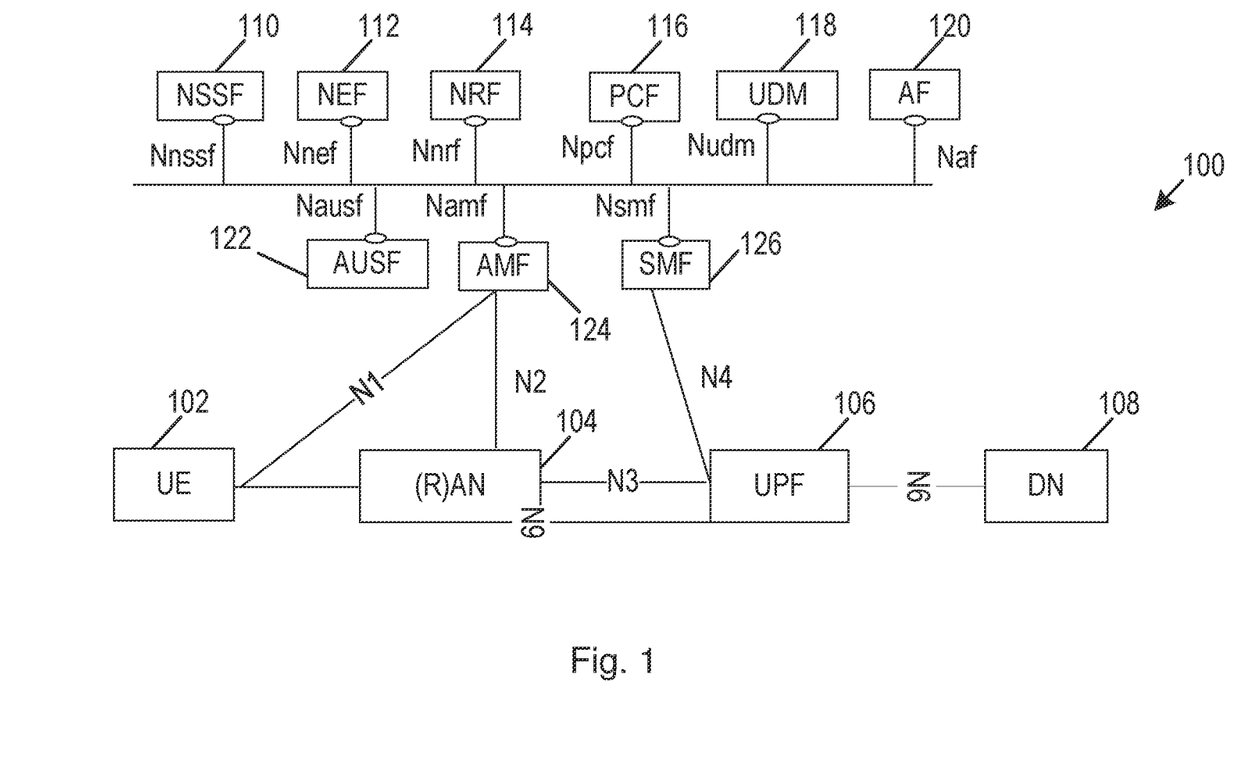
FIG. 1 illustrates a part of a network architecture.

FIG. 1 illustrates a reference architecture 100 for a 5G network, as proposed by 3GPP, and in particular as disclosed in 3GPP TS 23.501 v16.0.2.

A User Equipment device (UE) 102 connects to a (Radio) Access Network ((R)AN) 104. The (R)AN 104 connects to a User Plane Function (UPF) 106, and hence to a Data Network (DN) 108.

Other network nodes shown in FIG. 1 are the Network Slice Selection Function (NSSF) 110, Network Exposure Function (NEF) 112, Network Repository Function (NRF) 114, Policy Control Function (PCF) 116, Unified Data Management (UDM) 118, Application Function(s) (AF) 120, Authentication Server Function (AUSF) 122, Access and Mobility Management Function (AMF) 124, and Session Management Function (SMF) 126.

The network shown in FIG. 1 operates in a generally conventional way, except as described in more detail below.

Figure 2:
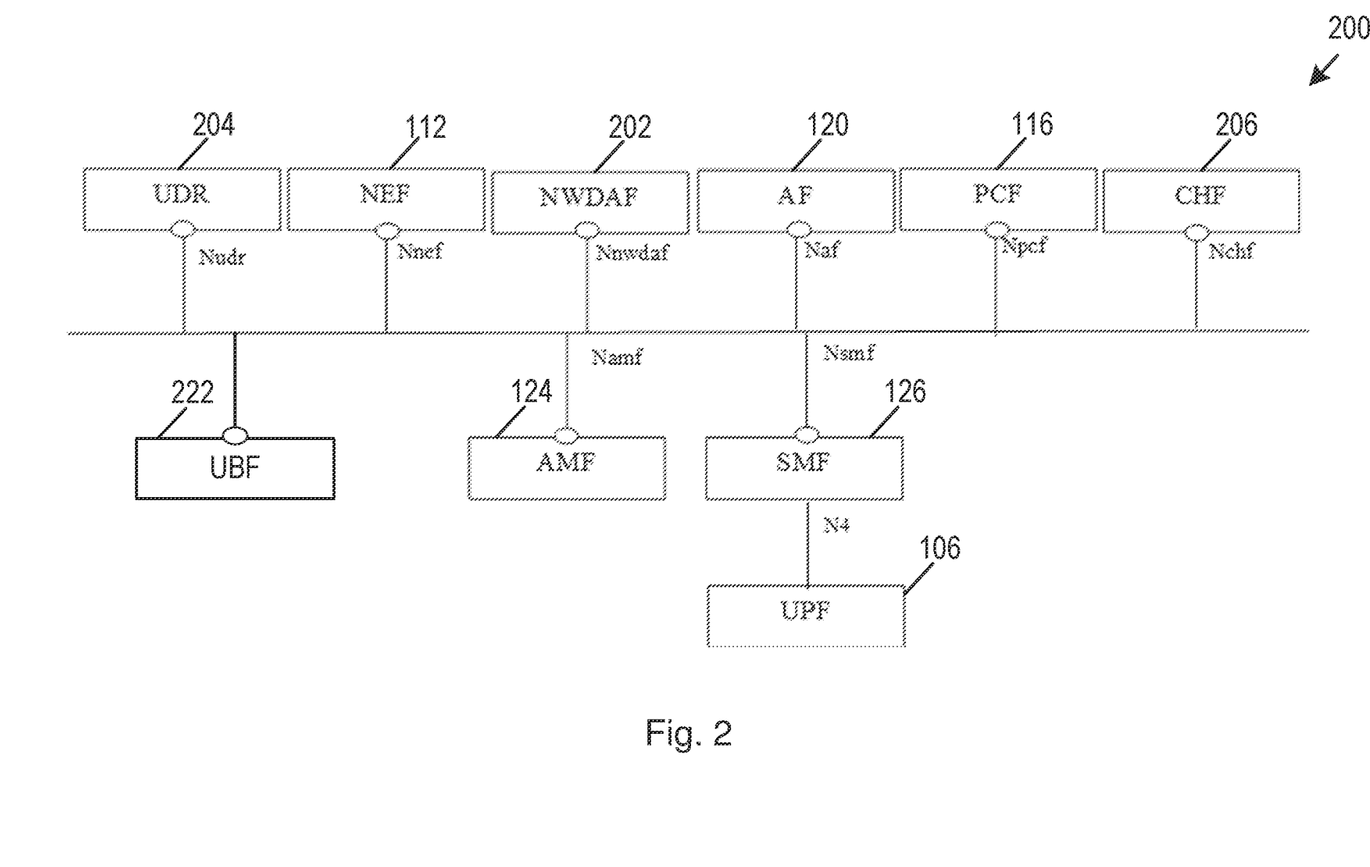
FIG. 2 illustrates a part of a network architecture.

FIG. 2 shows an architecture 200 policy, charging and analytics in a 5G network, in accordance with the present invention. The architecture 200 shown in FIG. 2 is generally as defined by 3GPP, except as described in more detail below.

In particular, this includes a Network Data Analytics Function (NWDAF) 202, the operation of which is described in more detail below. Other network nodes shown in FIG. 2 are the User Data Repository (UDR) 204, the Network Exposure Function (NEF) 112, Application Function(s) (AF) 120, Policy Control Function (PCF) 116, CHarging Function (CHF) 206, Access and Mobility Management Function (AMF) 124, and Session Management Function (SMF) 126.

The User Plane Function (UPF) 106 connects to the other nodes through the Session Management Function (SMF) 126.

FIG. 2 also shows a node not previously specified by 3GPP, referred to herein for the purposes of this disclosure only as a UE-UPF Binding Function (UBF) 222.

The UE-UPF Binding Function (UBF) 222 is described herein, by way of illustration only, as a standalone node, but it can also be collocated with existing network functions (for example the SMF, or the UDM, or any other convenient node). The UBF may be a centralized node. Alternatively, the UBF can be distributed, in which case it may provide a single point of access. The UBF may be provided as a 3GPP network function. Alternatively, the UBF may be provided as an independent Service-Based Architecture (SBA) service.

As mentioned above, the Network Data Analytics Function (NWDAF) 202 is part of the architecture specified in TS 23.501 and uses the mechanisms and interfaces specified for the 5G core network and for Operations, Administration and Maintenance (OAM).

The NWDAF interacts with different entities for different purposes. As one example, the NWDAF performs data collection based on event subscription, provided by network functions (NFs) of the 5G core network (for example the AMF, SMF, PCF, UDR, and NEF), by other application functions (AFs), and by OAM. As another example, the NWDAF retrieves information from data repositories, for example the UDR for subscriber-related information, the NRF for NF-related information, and the NSSF for slice-related information. As another example, the NWDAF provides, on demand, analytics to NFs of the 5G core network, AFs and OAM.

Figure 3:
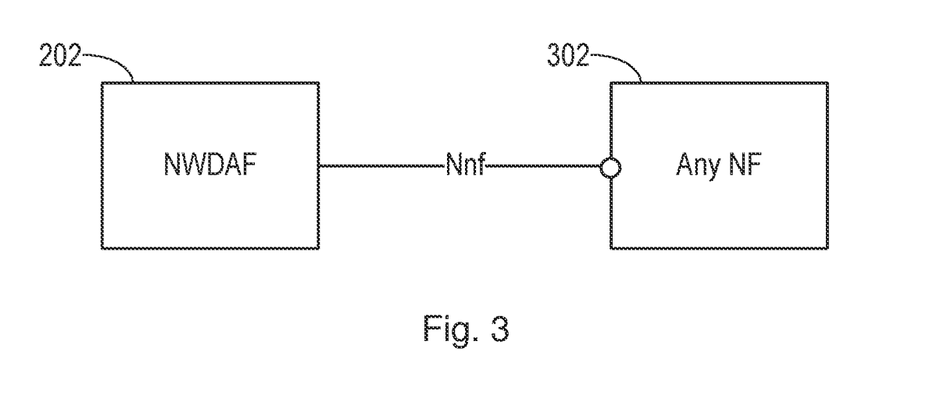
FIG. 3 illustrates a connection between network functions.

FIG. 3 shows the NWDAF 202 connected to a Network Function 302, which may be any NF, for example one of the NFs mentioned above, in order to collect data from the NF. The NWDAF 202 belongs to the same Public Land Mobile Network (PLMN) where the network function 302 that notifies the data is located.

FIG. 3 shows the NWDAF 202 connected to the NF 302 by means of the Nnf interface, and this refers to the Event Exposure service of each NF. The Event Exposure service is invoked by the NWDAF in order to collect data for a particular context (based on notifications received for subscribed events), to cancel a subscription for data collection, and to get a specific report of data for a particular context.

The NWDAF subscribes to a NF or an AF to be notified at certain events, and then the NWADF receives a notification, with the relevant information, when the event occurs.

The NWDAF collects data from NFs/AFs based on the exposure services (specifically the Event Exposure Service) offered by network functions such as the AMF, SMF, UDM, PCF, NRF and AF via the NEF.

This exposure service is used directly by the NWDAF in order to retrieve data for individual UEs or UE groups (for example based on UE location) from each NF (or AF).

Figure 4:
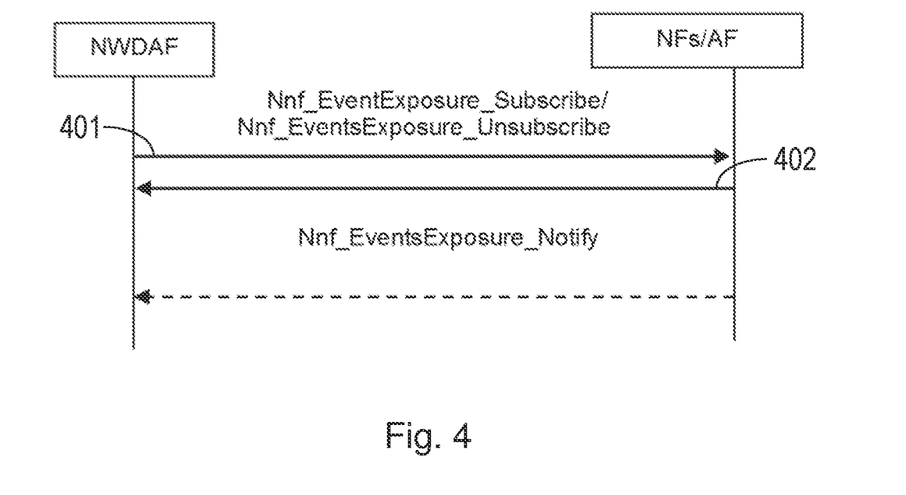
FIG. 4 is a signalling diagram illustrating operation of an event exposure service.

FIG. 4 is a signalling diagram, taken from 3GPP TS 23.288 v0.4.0, illustrating a procedure used by the NWDAF to subscribe to, or unsubscribe from, the Event Exposure service at an NF or AF, in order to manage notifications for data collection on one or more relevant event.

Specifically, as shown in message 401 in FIG. 4, the NWDAF may subscribe (or unsubscribe) message to the Event Exposure service in any NF(s) or AF(s).

The message 401 may use the framework defined in 3GPP TS 23.502 clause 4.15. This framework supports the possibility for the NWDAF to use the subscription message to indicate:

- one or multiple Event ID(s), as defined in TS 23.502 clause 4.15.1;
- the objects targeted by the Events, as defined in TS 23.502 clause 4.15.1 (within a subscription, all Event IDs are associated with the same target of event reporting, and in the case of the NWDAF, the objects can be one or more UE, one or more UE group, or any UE);
- Event Filter Information, as defined in TS 23.502 clause 4.15.1, providing Event Parameter Types and Event Parameter Value(s) to be matched against;
- a Notification Target Address and a Notification Correlation ID, as defined in TS 23.502 clause 4.15.1, allowing the NWDAF to correlate notifications received from the NF with this subscription;
- Event Reporting Information, as described in TS 23.502 Table 4.15.1-1; and/or
- an Expiry time as defined in TS 23.502 clause 4.15.1.

As shown by message 402, and NF/AF receiving a subscription message 401 may then provide notifications to the NWDAF. The notification message 402 may contain, in addition to the Event being reported, some dedicated information being reported for this event, such as:
- the Notification Correlation Information provided by the NWDAF in its request;
- the Target ID, for example the ID (such as a SUbscription Permanent Identifier (SUPI)) of a UE, when applicable to the event, and, if available, a Generic Public Subscription Identifier (GPSI); and/or
- a time-stamp.

The document 3GPP TS 23.288 v0.4.0 defines that the NWDAF collects data from NFs using their Event Exposure services. The same document also defines some data that is produced by the UPF (for example bit rates, delays, packet retransmissions, etc.). It has also been proposed that the UPF should implement an Event Exposure service.

Implementation of the Event Exposure service in the UPF entails certain problems. For example, the events that are exposed by the UPF can be per user (that is, associated to a specific user-ID), but there is no procedure for a NF (for example the NWDAF) that wants to consume the Event Exposure service in the UPF to discover the UPF that is associated to a certain user for a certain Event-ID. As another example, when a certain user is initially assigned to a UPF, it may be later assigned to another UPF. This means that, if the UPF implements an Event Exposure service, there is no mechanism for a NF (for example the NWDAF) that has subscribed to the Event Exposure service for a specific user to ensure the persistence of the subscription if the user is assigned to a different UPF.

Figure 5:
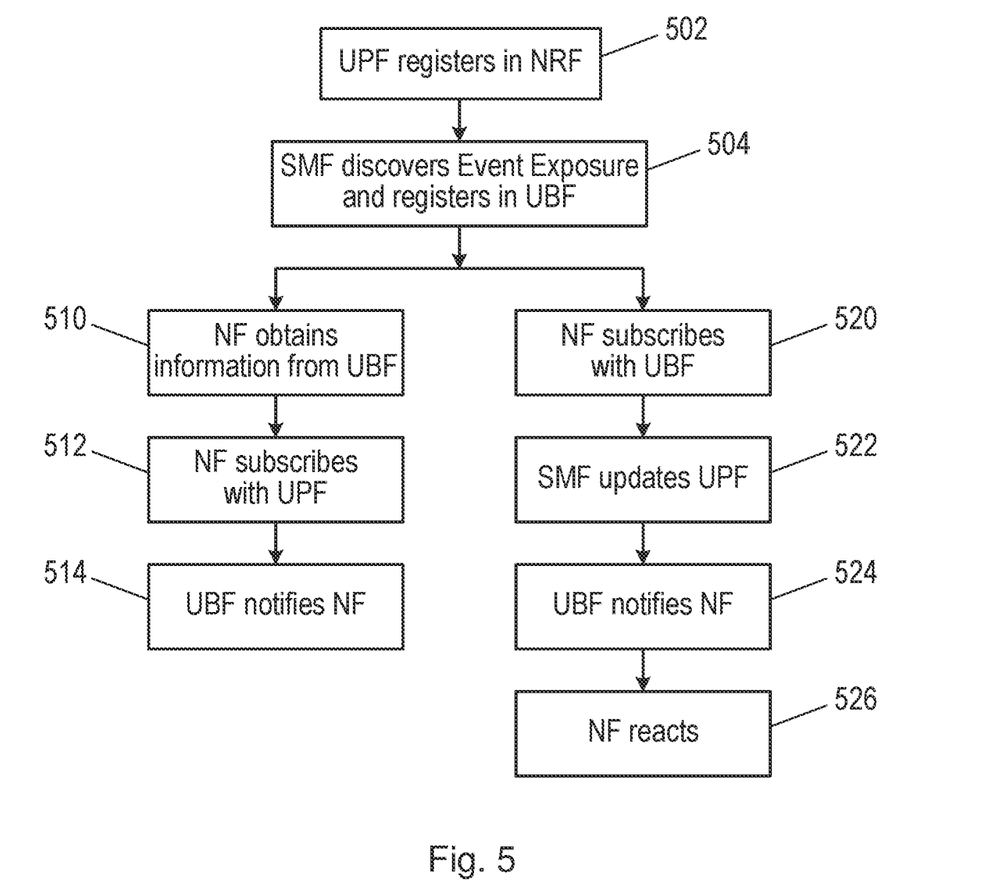
FIG. 5 is a flow chart, illustrating methods in accordance with the disclosure.

FIG. 5 is a flow chart, illustrating methods in accordance with the present disclosure.

At step 502 of the method, the UPF 106 registers with the Network Repository Function (NRF) 114.

Figure 6:
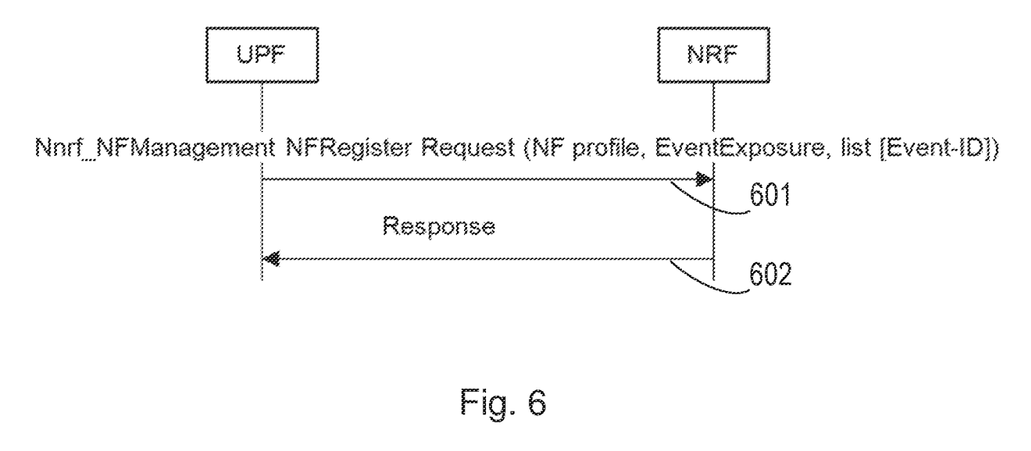
FIG. 6 is a signalling diagram, illustrating a first method as shown in FIG. 5.

The UPF registration process in the NRF is shown in more detail in FIG. 6.

Specifically, the existing NRF registration operation from the UPF is extended to allow the Event Exposure service, and the Event-IDs supported by that service, to be registered. One or more Event Exposure services could be registered by a single UPF, with each Event Exposure service supporting one or multiple Event-IDs.

Thus, in message 601, the UPF invokes the Nnrf_NFManagement NFRegister Request, and this request includes the NF profile, an indication that the UPF supports the Event Exposure service, and the list of Event-IDs that are supported by the Event Exposure service for this UPF.

In message 602, the NRF acknowledges the registration to the UPF.

Returning to FIG. 5, at step 504, the SMF discovers the supported Event Exposure service, and registers this in the new UBF network function.

Figure 7:
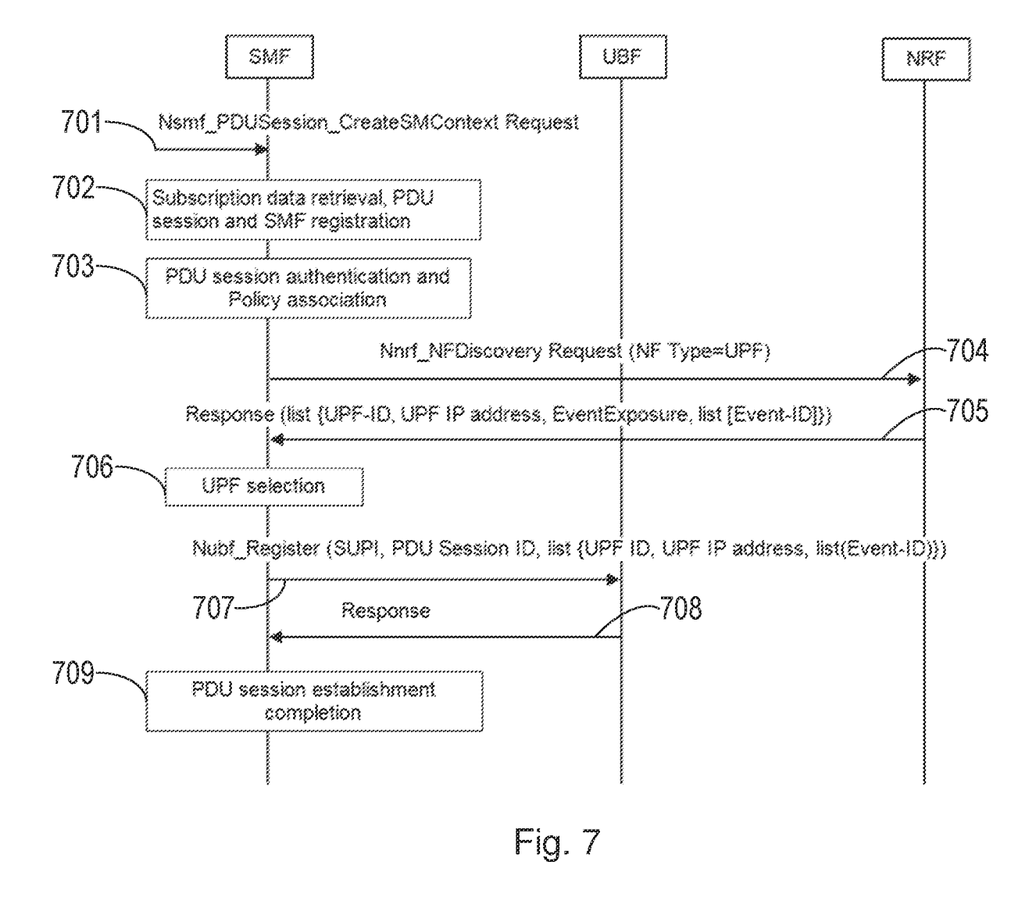
FIG. 7 is a signalling diagram, illustrating a second method as shown in FIG. 5.

The SMF discovery of the supported Event Exposure service, and its registration in the UBF, is shown in more detail in FIG. 7.

Thus, in message 701, a network function, for example the AMF, invokes Nsmf_PDUSession_CreateSMContext Request at the SMF, including the SUbscription Permanent Identifier (SUPI).

At step, 702, the SMF performs its conventional subscription data retrieval, Protocol Data Unit (PDU) session, and SMF registration procedures.

At step 703, the SMF performs its conventional PDU session authentication and Policy association procedures.

Then, in message 704, the SMF sends a UPF discovery request to the NRF invoking the Nnrf_NFDiscovery Request (with NF Type=UPF).

In message 705, the NRF responds to the SMF including a list of tuples. As is conventional, each tuple includes the UPF-ID, and the UPF IP address.

However, in the case illustrated here, where the UPF registration process in the NRF has stored the information that the UPF supports the Event Exposure service, message 705 also contains an explicit or implicit indication that the UPF supports the Event Exposure service, and may also contain a list of supported Event-IDs.

At step 706, the SMF selects the UPF from among the list received from the NRF.

Then, in message 707, the SMF registers the user-UPF binding in the new network function, the UBF 222, invoking Nubf_Register. This registration includes a user ID (for example the SUPI) and/or a PDU Session ID, and also includes a list of tuples. Each tuple may include some or all of: the UPF ID; the UPF IP address; and a list of Event-IDs that are supported by the Event Exposure service for this UPF. The list of supported Event-IDs may be specific to a certain PDU session and/or to a certain user.

In message 708, the UBF acknowledges the registration.

At step 709, the establishment of the PDU session is completed.

Returning to FIG. 5, the stored indication about the supported Event Exposure service can be used in different ways.

For example, a network function can obtain notifications about events.

In step 510, the network function obtains information from the UBF. This is shown in more detail in FIG. 8.

Figure 8:
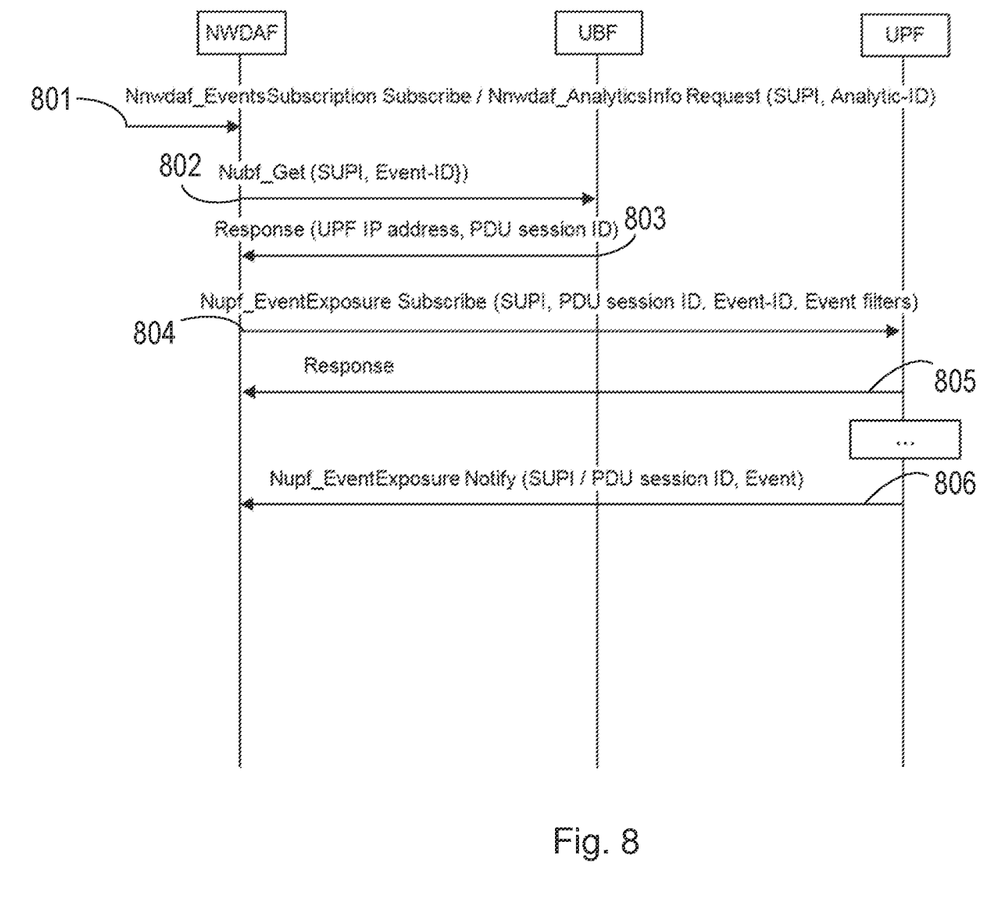
FIG. 8 is a signalling diagram, illustrating a third method as shown in FIG. 5.

FIG. 8 depicts the signal flow, by which one particular network function, namely the NWDAF, subscribes to obtain information about events that are relevant to a specific user. The use of the UBF means that the network function is able to identify the relevant UPF. FIG. 8 shows a process in which the network function is the NWDAF, but a generally similar process may be performed by any suitable network function, for example the NEF.

At step 801, the NWDAF receives a request for an analytic by means of the existing Nnwdaf_EventsSubscription Subscribe or Nnwdaf_AnalyticsInfo Request service operations, including the SUPI of the user of interest, and the Analytic-ID.

The NWDAF needs to know the UPF associated to the user having that SUPI, and so, in message 802, it queries the UBF invoking Nubf_Get, including the SUPI and the Event-ID of the desired event. The Event-ID(s) needed for a specific Analytic-ID are known by the NWDAF.

In message 803, the UBF responds to the NWDAF, including the UPF IP address and/or the PDU session ID for the user identified by that SUPI.

Thus, the network function obtains information from the UBF, and that information identifies the UPF associated with the user of interest.

In step 512 of the process shown in FIG. 5, the network function subscribes with the UPF identified in the received information.

FIG. 8 shows the subscription step in more detail.

Thus, in message 804, the NWDAF subscribes to the Event Exposure service of the previously identified UPF, by invoking the Nupf_EventExposure Subscribe. This message includes the SUPI and/or a PDU Session ID. In particular, if the UPF does not handle SUPIs, the PDU session ID can be used instead. In addition, the message 804 also includes other information relevant to the subscription, namely the Event-ID of the event(s) that the NWDAF is interested in, and any Event filters.

In message 805, the UPF acknowledges the subscription.

Thus, the network function subscribes with the UPF identified in the information that was received in step 510.

In step 514 of the process shown in FIG. 5, the UPF notifies the network function of a relevant event.

FIG. 8 shows the notification step in more detail.

Thus, when a relevant event (as defined in the message 804) occurs, in message 806 the UPF reports the event to the NWDAF. Specifically, it invokes Nupf_EventExposure Notify, including the SUPI and/or PDU session ID (depending on the which of these identifies can be handled by the UPF), and information about the Event.

The NWDAF is then able to use the received information about the Event in generating the analytic requested in step 801.

Thus, FIG. 8 shows how the network function, in the illustrated example the NWDAF, retrieves from the UBF the IP address of the UPF that is allocated to a certain user for a certain Event-ID. Using this information, the network function subscribes to the Event Exposure service in the UPF for the or each relevant subscriber, and for one or multiple Event-IDs.

Although, in the illustrated example, the network function is the NWDAF, there exists the possibility of having the NEF as an intermediary. In this case, the NWDAF subscribes to the Event Exposure service of the NEF, the NEF interacts with the UBF to find the UPF associated with the user, and in turn the NEF subscribes to the Event Exposure service of the UPF.

Returning to FIG. 5, this also shows how the stored indication about the UPF that is associated with a UE can be updated in the event of a change of UPF.

In step 520 of the process shown in FIG. 5, a network function subscribes with the UBF.

Figure 9:
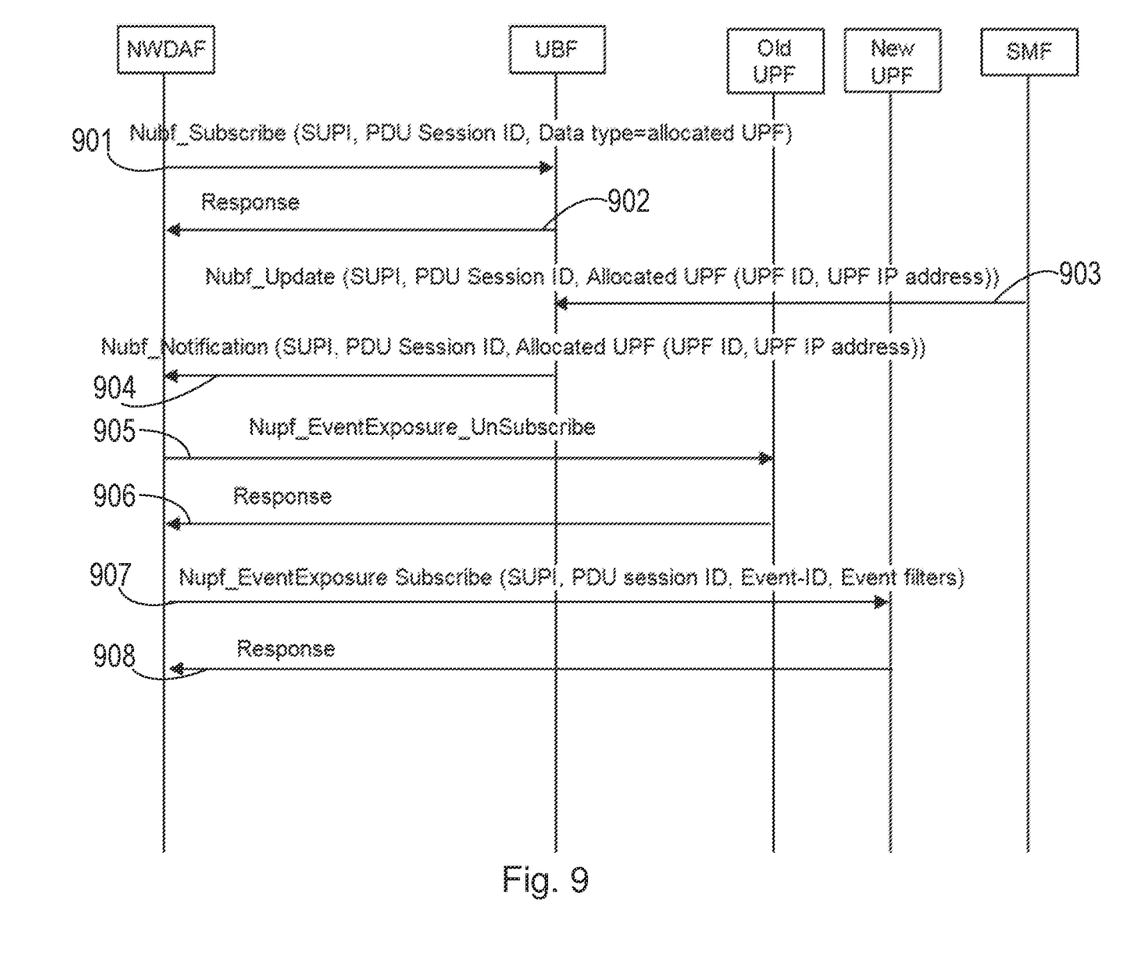
FIG. 9 is a signalling diagram, illustrating a fourth method as shown in FIG. 5.

FIG. 9 shows the subscription step in more detail.

Specifically, the NWDAF sends message 901 to the UBF, subscribing to receive UPF allocation changes by invoking Nubf_Subscribe, with the message including the SUPI and/or the PDU Session ID, and also specifying that the Data type, about which it wishes to receive information, is the allocated UPF.

In message 902 to the NWDAF, the UBF acknowledges the subscription.

Thus, the NWDAF has subscribed with the UBF, identifying a user and/or a session, and requesting to be notified when there is any change to the UPF allocated to that user or session.

Then, in step 522 of the process shown in FIG. 5, a SMF updates the UBF.

FIG. 9 shows the update step in more detail.

Specifically, when there is a change in the UPF that is allocated to the user and/or session identified by the NWDAF in message 901, the SMF invokes the Nubf_Update message 903, including the SUPI and/or the PDU Session ID. The message also includes information about the newly allocated UPF. For example, the message may include the UPF ID of the newly allocated UPF, and its IP address.

Thus, the UBF is updated with the new information.

In step 524 of the process shown in FIG. 5, the UBF notifies the network function about the newly allocated UPF.

FIG. 9 shows the notification step in more detail.

Specifically, when the UBF is notified that there has been a change in the UPF that is allocated to the user and/or session identified by the NWDAF in message 901, the UBF sends a notification 904 to the NWDAF, invoking the Nubf_Notification message. This includes the SUPI and/or the PDU Session ID. The message also includes some or all of the information received from the SMF about the newly allocated UPF. For example, the message 904 may include the UPF ID of the newly allocated UPF, and its IP address.

Thus, the network function is notified about the change of UPF allocated to a user of interest.

In step 526 of the process shown in FIG. 5, the NF reacts to this change.

FIG. 9 shows the reaction step in more detail.

Specifically, in this illustrated example, the NWDAF unsubscribes to the old UPF invoking the Nupf_EventExposure_UnSubscribe message 905. The old UPF acknowledges the un-subscription in message 906.

Then, the NWDAF subscribes to the new UPF invoking the Nupf_EventExposure Subscribe message 907. This message includes the SUPI and/or a PDU Session ID. In particular, if the UPF does not handle SUPIs, the PDU session ID can be used instead. In addition, the message 804 also includes other information relevant to the subscription, namely the Event-ID of the event(s) that the NWDAF is interested in, and any Event filters.

In message 908, the new UPF acknowledges the subscription.

Thus, this allows the persistence of the subscriptions to the Event Exposure service of the UPF, in the event of UPF re-selection. Specifically, the network function subscribes to the UBF to receive notifications about UPF reselection, and, when the UBF is updated by the SMF, the network function receives a notification, and is then able to update its subscriptions to the event exposure functionality when the UPF is reselected for the user.

Figure 10:
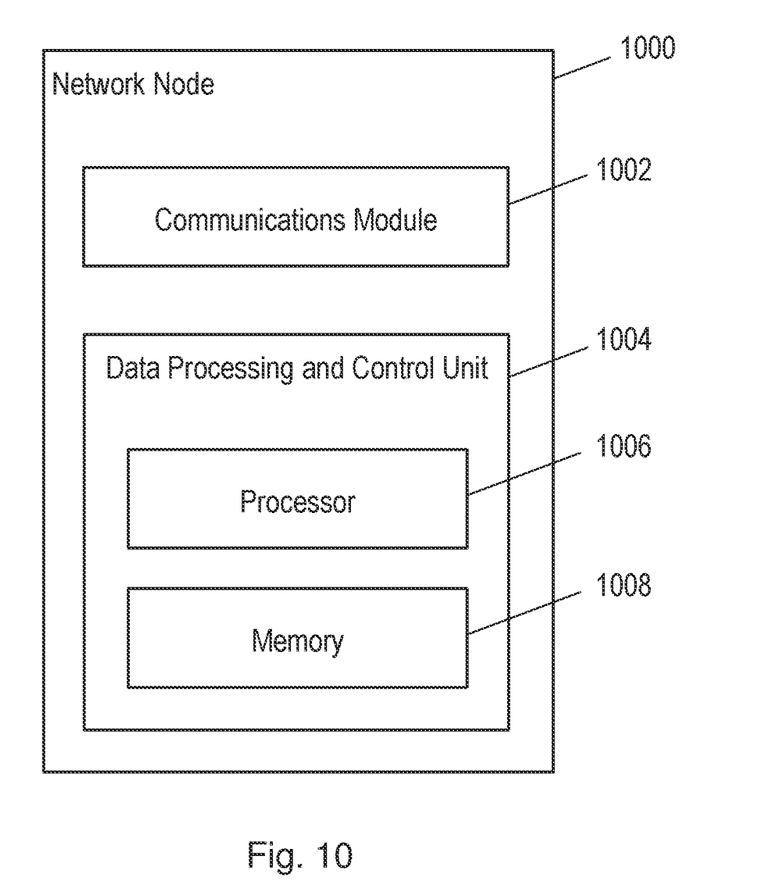
FIG. 10 is a block schematic diagram, illustrating a form of a network node in accordance with the disclosure.

FIG. 10 is a block schematic diagram, illustrating a form of a network node 1000 in accordance with the disclosure.

The network node 1000 may implement any of the network functions described herein, such as the Network Slice Selection Function (NSSF) 110, Network Exposure Function (NEF) 112, Network Repository Function (NRF) 114, Policy Control Function (PCF) 116, Unified Data Management (UDM) 118, Application Function(s) (AF) 120, Authentication Server Function (AUSF) 122, Access and Mobility Management Function (AMF) 124, Session Management Function (SMF) 126, Network Data Analytics Function (NWDAF) 202, User Data Repository (UDR) 204, CHarging Function (CHF) 206, and/or the UE-UPF Binding Function (UBF) 222.

The network node 1000 has a communications module 1002, allowing communication with any other network node, for example in the Radio Access Network or in the Core Network, over any suitable wired or wireless interface.

The network node 1000 also has a data processing and control unit 1004, which includes one or more processor 1006 and one or more memory 1008. The memory 1008 may store data and/or programs, and the processor 1006 may operate under the control of the stored program(s) to perform any of the methods described herein.

There is thus provided a mechanism to allow a network function to take advantage of event exposure in a UPF network function.

ABBREVIATIONS

The following abbreviations and acronyms are used in this document.

| Abbreviation | Explanation |
| --- | --- |
| ABR | Adaptive Bit Rate |
| AMF | Access and Mobility Management Function |

| Abbreviation | Explanation |
| --- | --- |
| AP | Access Point |
| ARR | Analytics Reporting Rule |
| BAR | Buffering Action Rule |
| CP | Control Plane |
| CUPS | Control User Plane Separation |
| eNB | enhanced Node B |
| FAR | Forwarding Action Rule |
| KPI | Key Performance Indicator |
| MBR | Maximum Bit Rate |
| NEF | Network Exposure Function |
| NSSF | Network Slice Selection Function |
| NWDAF | Network Data Analytics Function |
| ONAP | Open Network Automation Protocol |
| OTT | Over the Top |
| PCF | Policy Control Function |
| PDR | Packet Detection Rule |
| PFCP | Packet Forwarding Control Protocol |
| QER | QoS Enforcement Rule |
| QoE | Quality of Experience |
| RL | Reinforcement Learning |
| SMF | Session Management Function |
| UDM | Unified Data Management |
| UE | User Equipment |
| UPF | User Plane Function |
| URR | Usage Reporting Rule |

The invention claimed is:

1. A method of operation of a network function in a telecommunications network, the method comprising:
for a communication session, storing information identifying a User Plane Function (UPF), storing information identifying a User, and storing information indicating an Event-ID that is specific to the User and is supported by an event exposure service for the UPF, wherein the information identifying the UPF, information indicating the Event-ID that is specific to the User, and the information identifying the User are stored with an association to said communication session;
receiving a request from a requesting network function that includes information identifying the Event-ID; and
responsive to receiving the request, sending to the requesting network function information identifying a UPF allocated to the User for the Event-ID.

2. The method according to claim 1, wherein storing information identifying a User Plane Function associated with said communication session comprises storing information identifying a User Plane Function and information identifying the communication session.

3. The method according to claim 1, wherein the information identifying the User is a subscription Permanent Identifier, SUPI.

4. The method according to claim 1, wherein the information identifying the communication session is a Session ID.

5. The method according to claim 1, comprising storing said information identifying the User Plane Function associated with said communication session in response to a registration message from a Session Management Function, SMF.

6. The method according to claim 1, wherein the information identifying the UPF comprises an IP address of the UPF.

7. The method according to claim 1, further comprising:
updating the stored information identifying the User Plane Function associated with said communication session, in response to an update message from a SMF.

8. The method according to claim 7, further comprising:
receiving an update subscription from another network function; and
following the update message from the SMF, informing the another network function of the updated stored information identifying the User Plane Function associated with said communication session.

9. A network node comprising a processor configured for performing operations comprising:
for a communication session, storing information identifying a User Plane Function (UPF), storing information identifying a User, and storing information indicating at least one Event-ID that is specific to the User and is supported by an event exposure service for the UPF, wherein the information identifying the UPF, information indicating the at least one Event-ID that is specific to the User, and the information identifying the User are stored with an association to said communication session;
receiving a request from a requesting network function that includes information identifying the Event-ID; and
responsive to receiving the request, sending to the requesting network function information identifying a UPF allocated to the User for the Event-ID.

10. The network node according to claim 9, the processor configured for performing further operations comprising:
wherein storing information identifying a User Plane Function associated with said communication session comprises storing information identifying a User Plane Function and information identifying the communication session.

11. The network node according to claim 9, wherein the information identifying the User is a subscription Permanent Identifier, SUPI.

12. The network node according to claim 9, wherein the information identifying the communication session is a Session ID.

13. The network node according to claim 9, wherein the information identifying the UPF comprises an IP address of the UPF.

14. A method of operation of a network function in a telecommunications network, the method comprising:
in response to initiation of a data session, sending a User Plane Function discovery request to a Network Repository Function, NRF;
receiving a response from the NRF, said response containing information identifying at least one User Plane Function, UPF, allocated to a User and information indicating that at least one identified UPF supports an event exposure service, wherein the information identifying the at least one UPF includes a UPF-ID and a UPF IP address;
selecting an identified UPF; and
registering the selected UPF in a network function, with information identifying a User, information identifying the selected UPF, and information indicating at least one Event-ID that is specific to the User and is supported by the event exposure service for the selected UPF.

15. A computer program product, comprising code configured for causing a suitably programmed processor to perform operations comprising:
for a communication session, store information identifying a User Plane Function (UPF), storing information identifying a User, and storing information indicating at least one Event-ID that is specific to the User and is supported by an event exposure service for the UPF, wherein the information identifying the UPF, information indicating the at least one Event-ID that is specific to the User, and the information identifying the User are stored with an association to said communication session;

receiving a request from a requesting network function that includes information identifying the Event-ID; and responsive to receiving the request, sending to the requesting network function information identifying a UPF allocated to the User for the Event-ID.

* * * * *